United States Patent [19]

Teigen et al.

[11] Patent Number: 5,279,158

[45] Date of Patent: Jan. 18, 1994

[54] STEAM BUBBLER WATER LEVEL MEASUREMENT

[75] Inventors: Bard C. Teigen, Enfield; William P. Bailey, East Granby, both of Conn.; Brian P. DeMarey, Bondsville, Mass.; Anthony Marone, III, Durham, Conn.

[73] Assignee: Combustion Engineering, Inc., Windsor, Conn.

[21] Appl. No.: 998,523

[22] Filed: Dec. 30, 1992

[51] Int. Cl.⁵ ............................................. G01F 23/14
[52] U.S. Cl. ...................................................... 73/302
[58] Field of Search ........................... 73/299, 301, 302

[56] References Cited

U.S. PATENT DOCUMENTS

| | | | |
|---|---|---|---|
| 3,262,313 | 7/1966 | Hanna | 73/302 |
| 3,424,003 | 1/1969 | Rausch. | |
| 3,835,335 | 9/1974 | Robischon. | |
| 4,639,738 | 1/1987 | Young et al. | 73/301 X |

OTHER PUBLICATIONS

"Level Instruments," Chemical Engineering. Jan. 14, 1980: 94.
"I & C Special Section." Power. Sep. 1990: 54.

Primary Examiner—Daniel M. Yasich
Attorney, Agent, or Firm—Chilton, Alix & Van Kirk

[57] ABSTRACT

A liquid level measuring system for the steam drum of a steam generator employs a plurality of bubblers spaced along the length of the drum to obtain a level profile. The steam pressure to the bubblers is supplied by tubes connected to the steam/water inlet space which has a pressure significantly higher than the steam space in the drum. Horizontal pressure taps on each bubbler transmit the pressure to pressure cells external to the drum where the bubbler pressure is compared to the pressure in the steam space. These reading can then be converted to liquid level readings.

6 Claims, 2 Drawing Sheets

STEAM BUBBLER WATER LEVEL MEASUREMENT

This invention relates to the steam drum of a steam generating system and involves the system for measuring the water level in the drum.

The proper operation of a steam drum in separating the steam from the liquid water requires that the level of the liquid be maintained within certain limits. The rate at which feedwater is introduced into the drum can be used as a means for controlling this level but it is first necessary that the level be measured. Measuring the level within the confines of a high pressure steam drum and measuring the level at various points with a minimum number of vessel penetrations is not an easy task.

Conventional instruments used for measuring the liquid level in a steam drum include glass gauges, pressure differential transducers, conductivity measurement probes, magnetic floats and heated junction thermocouples. Each of these instruments has certain restrictions or complications for providing fluid level profiles in the enclosed, high pressure, high temperature environment of saturated steam drums. Glass gauges provide level readings almost exclusively at the ends of the drum. Pressure differential transducers require careful compensation for density changes in the water leg. The conductivity probes, magnetic floats and heated junction thermocouples require introduction, control and detection of additional signals to determine the fluid level.

SUMMARY OF THE INVENTION

An object of the present invention is to provide a steam drum liquid level measurement system which is accurate and yet rugged and simple to install and operate and requires no external signals or media. A further object is to provide for measurement at multiple locations along the length of the drum while requiring a minimum number of vessel penetrations.

In particular, an object of the invention is to provide a bubbler liquid level measurement system which uses steam pressure from the incoming steam space as the source of bubbling pressure for each bubbler in the drum. A pressure tap for each bubbler together with a common pressure tap to the steam space leads to differential pressure measurement cells outside the drum. This differential pressure together with vapor and liquid density measurements converts to liquid level.

A further object is to construct the bubbler system including its steam supply lines so that the appropriate bubbler flow is automatically maintained over the range of pressures, densities and liquid levels to be encountered during operation of the equipment.

DESCRIPTION OF THE PREFERRED EMBODIMENT

Figure 1:
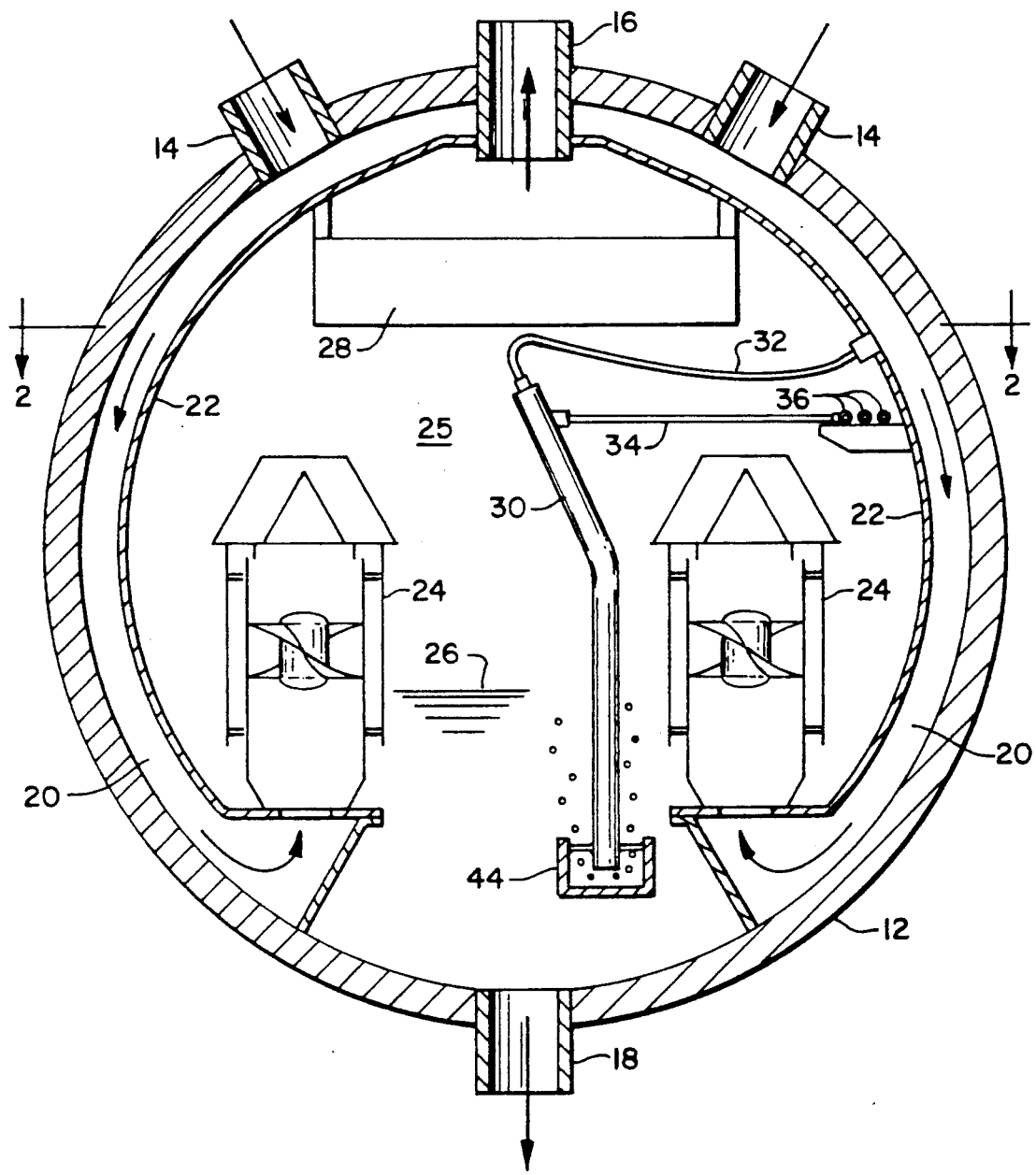
FIG. 1 is a cross section view of a steam drum showing the drum internals and incorporating the present invention.

FIG. 1 is a vertical cross section view of a typical steam drum 12 having vapor/liquid mixture inlets 14 from the steam generating tubes, steam outlet 16 and liquid outlet 18. The steam/water mixture enters the drum into the confined annular space 20 between the drum 12 and the baffle 22. This steam/water mixture flows down through the annular space 20 and then up into the steam separators 24 mounted on the baffle 22. These steam separators 24, which are spaced along the length of the drum, perform the primary and secondary separation of the vapor and liquid. The liquid is directed down into the pool of liquid water in the bottom of the drum and the vapor rises into the steam space 25. The liquid level is shown at 26. The separated vapor then flows through the steam dryer 28 and exits through the steam outlet 16. Although certain configurations and limited details of the baffle 22, the steam separators 24 and the steam dryer 28 have been illustrated, they are only by way of example and the water level measuring system to be described is not limited to these examples.

Figure 2:
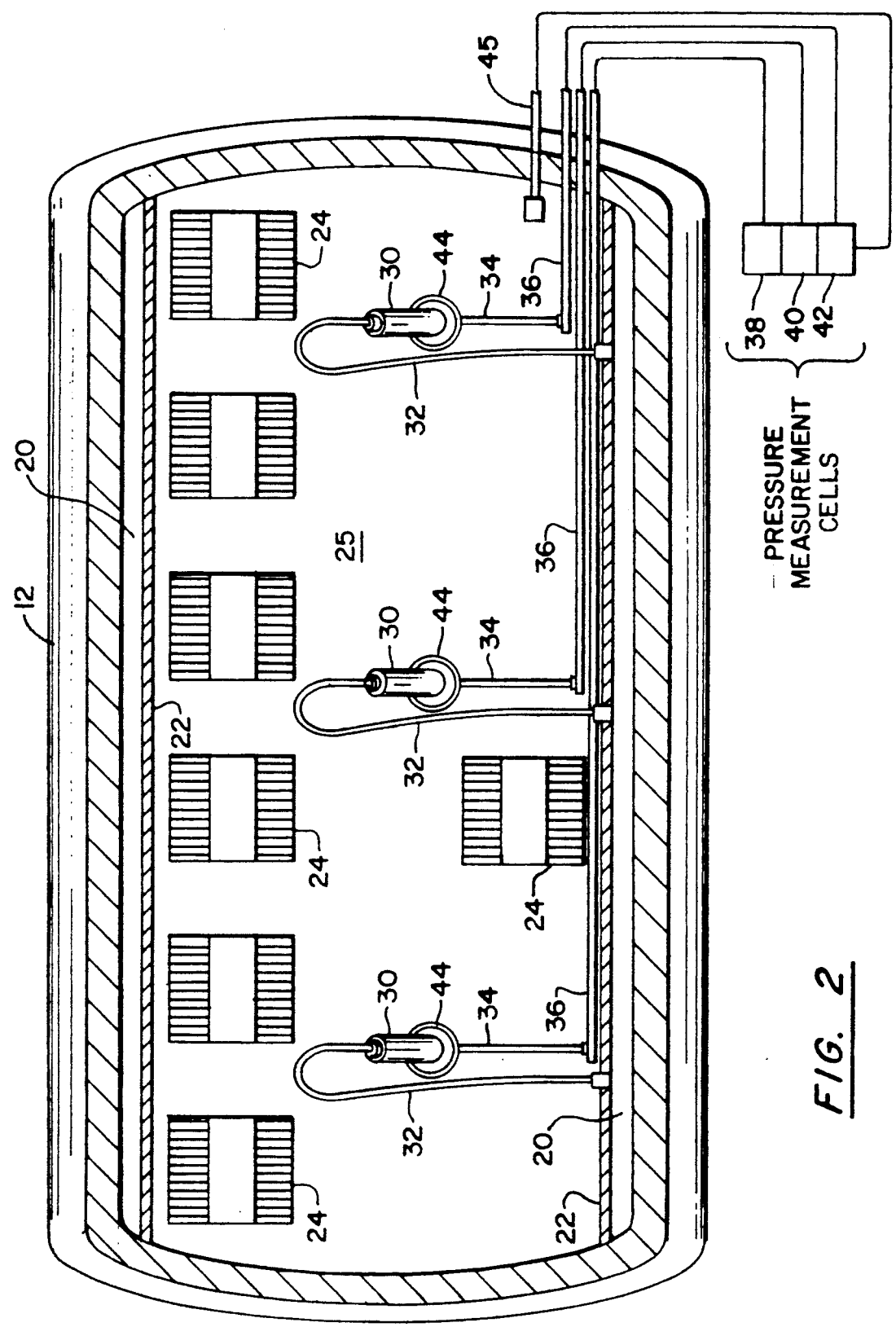
FIG. 2 is a cross section view taken along line 22 of FIG. 1 (omitting some steam separators for clarity) showing a plan view of the arrangement of the bubblers along the length of the drum.

As indicated, the liquid level is shown at 26. This liquid level can vary during operation depending upon a variety of operating parameters and it can also vary along the length of the drum. For that reason, the present invention incorporates a plurality of liquid level measurement devices spaced along the length of the drum so that readings can be obtained for localized areas. Although three such devices are illustrated in FIG. 2, any desired number can be used.

The bubble tube 30 which has its top end located in the steam space 25 and its bottom end located at an elevation which is always below any anticipated liquid level 26. The top end of the bubbler tube 30 is connected by the small pressure supply tube 32 through the baffle 22 to the annular space 20. This tube 32 supplies steam pressure to the bubbler tube 30 at the pressure of the incoming steam/water mixture in the annular space 20. There is a significant pressure differential between the pressure in the annular space 20 and the pressure in the steam space 25 of the drum due to pressure drops through the annular space 20 and the steam separators 24. This pressure differential is sufficient to cause the steam in the bubbler tube 30 to force the liquid down inside the tube and for steam to bubble out of the bottom of the bubbler tube 30 as illustrated in FIG. 1.

The differential between the pressure in the bubbler tube 30 and the pressure in the steam space 25 is directly related to the liquid level in the drum knowing the density or specific volume of the liquid and the vapor. The density or specific volume of the saturated vapor and liquid are readily obtained from steam tables using a measurement of the pressure in the drum. Of course, the vertical distance reading is the distance above the bottom of the bubbler tube 30. Since the location of the bottom of the bubbler tube is known, the actual liquid level is also known.

In order to determine the pressure in the bubbler tubes 30, a pressure tap line 34 is attached to each of the bubbler tubes 30 and to one of the three pressure measurement lines 36. These pressure measurement lines 36 exit through the vessel and are connected to a respective one of the pressure measurement cells 38, 40 and 42. Also connected to each of the pressure measurement cells is a common pressure line 45 which is connected into the steam space 25. Thus, each cell sees the pressure differential between its respective bubbler and the steam space 25.

As shown in FIG. 1, the pressure tap line 34 is horizontal as are the lines 36. It is not always known whether the lines 34 and 36 contain vapor or liquid. If these lines were not horizontal and if they contained liquid, the pressure reading would be effected by the pressure head. However, as long as these lines are horizontal, it does not make any difference whether they contain liquid or vapor.

In order to measure the liquid level using a bubbler, it is necessary that the pressure in the bubbler tubes be sufficient to force the liquid all the way to the bottom. However, the pressure cannot be much greater than the minimum pressure necessary to cause bubbling. If pressure and thus the flow rate were too high, there would be excessive bubbling and the pressure reading would be too high. In order to control this aspect of the invention, the line 32 is smaller in cross section than the bubbler tube 30. The small diameter limits the flow of steam through line 32 and thereby controls the flow through the bubbler tube 30. For any particular steam drum, it is known what the range of incoming steam pressures will be and what the anticipated range of water levels will be. Therefore, it can be determined what size the line 32 should be as compared to the size of the bubbler tube 30. As an example, the ratio of the cross-sectional area of the line 32 to the cross-sectional area of the bubbler tube 30 should be in the range of 1 to 50 up to 1 to 100. The ratio of the flow in each tube would be the inverse of the ratio of the cross-sectional area, i.e., the flow in line 32 would be 50 to 100 times as great as the flow in tube 30. By adjusting these sizes in relation to the known or expected pressures in the space 20 and space 25 and the expected water levels, the proper degree of bubbling can be assured.

Surrounding the bottom of the bubbler tubes 30 are the cups 44 which protect the bottoms of the bubbler tubes from turbulence in the pool of liquid. This tends to prevent fluctuations in the pressure readings which are not indicative of real changes in liquid level.

One of the features of the present invention is that the number of penetrations of the vessel 12 is minimized. There is only one penetration for each bubbler plus one common pressure penetration.

We claim:

1. Apparatus for measuring the liquid level in a steam drum, having a liquid pool in the bottom thereof and a steam space above the liquid pool and including an inlet vapor/liquid space and a vapor liquid separator between said inlet vapor/liquid space and said steam space whereby there is a pressure differential between said inlet vapor/liquid space and said steam space, said apparatus comprising:
   a. a bubbler tube having a top end located in said steam space and a bottom end located blow the level of the liquid pool,
   b. a pressure supply line connected to the top of said bubbler tube and to said inlet vapor/liquid space whereby inlet vapor pressure is applied to said bubbler tube,
   c. a horizontal bubbler pressure tap line connected to said bubbler tube and extending external of said steam drum,
   d. a horizontal steam space pressure tap line communicating with said steam space and extending external of said steam drum, and
   e. a pressure cell external of said steam drum connected to said horizontal bubbler pressure tap line and to said horizontal steam space pressure tap line whereby said pressure cell indicates the pressure difference between said bubbler tube and said steam space.

2. Apparatus as recited in claim wherein the cross-sectional area of said pressure supply line is smaller than the cross-sectional area of said bubbler tube.

3. Apparatus as recited in claim 2 wherein the ratio of said cross-sectional area of said pressure supply line to said cross-sectional area of said bubbler tube is from 1:50 to 1:100.

4. Apparatus as recited in claim 1 and further including a cup surrounding the bottom end of said bubbler tube in said liquid pool adapted to protect said bottom end from turbulence.

5. Apparatus as recited in claim 1 wherein a plurality of said bubbler tubes and their associated pressure supply lines and horizontal bubbler pressure tap lines are located in said steam drum.

6. Apparatus for measuring the liquid level in a steam drum having a liquid pool in the bottom thereof, a steam space above the liquid pool and a high pressure steam inlet region comprising a water level bubbler system extending below the level of the liquid pool, means for supplying stream from said high pressure steam inlet region into said bubbler tube, to cause minimal bubbling of said high pressure steam from said bubbler tube into said liquid pool, means for detecting the pressure of said high pressure steam in said bubbler tube, means for detecting the pressure in said steam space and means for measuring the difference between said pressure in said bubbler and said pressure in said steam space.

* * * * *

UNITED STATES PATENT AND TRADEMARK OFFICE
CERTIFICATE OF CORRECTION

PATENT NO. : 5,279,158

DATED : January 18, 1994

INVENTOR(S) : Bard C. Teigen et al

It is certified that error appears in the above-identified patent and that said Letters Patent is hereby corrected as shown below:

Col. 3, line 46, delete ",".

Column 4, line 4, change "blow" to --below--.

Column 4, line 22, after "claim", insert --1--.

Column 4, line 42, change "stream" to --steam--.

Signed and Sealed this

Sixteenth Day of August, 1994

Attest:

BRUCE LEHMAN

Attesting Officer

Commissioner of Patents and Trademarks